United States Patent
Honda et al.

(10) Patent No.: US 9,919,649 B2
(45) Date of Patent: Mar. 20, 2018

(54) WARNING DEVICE FOR VEHICLE AND OUTSIDE MIRROR DEVICE FOR VEHICLE

(71) Applicant: ICHIKOH INDUSTRIES, LTD., Isehara-shi, Kanagawa-ken (JP)

(72) Inventors: Keisuke Honda, Isehara (JP); Hideto Kurimoto, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 230 days.

(21) Appl. No.: 14/418,197

(22) PCT Filed: Jul. 30, 2013

(86) PCT No.: PCT/JP2013/070630
§ 371 (c)(1),
(2) Date: Jan. 29, 2015

(87) PCT Pub. No.: WO2014/021332
PCT Pub. Date: Feb. 6, 2014

(65) Prior Publication Data
US 2015/0191120 A1    Jul. 9, 2015

(30) Foreign Application Priority Data
Jul. 30, 2012   (JP) .................................. 2012-168063

(51) Int. Cl.
*G06K 9/00*        (2006.01)
*B60R 1/00*        (2006.01)
(Continued)

(52) U.S. Cl.
CPC ................. *B60R 1/00* (2013.01); *B60Q 1/00* (2013.01); *B60Q 9/008* (2013.01); *B60W 50/16* (2013.01);
(Continued)

(58) Field of Classification Search
CPC .......... G06K 9/00624; G06K 9/00805; B60W 50/14
(Continued)

(56) References Cited

U.S. PATENT DOCUMENTS

| 5,432,509 A | 7/1995 | Kajiwara |
| 6,269,307 B1 * | 7/2001 | Shinmura .............. B60Q 9/008 340/435 |

(Continued)

FOREIGN PATENT DOCUMENTS

| CN | 101488290 A | 7/2009 |
| EP | 1 623 875 A1 | 2/2006 |

(Continued)

OTHER PUBLICATIONS

Chinese Office Action dated Feb. 23, 2016 as received in corresponding Chinese Application No. 201380040481.2 and its English translation thereof.
(Continued)

*Primary Examiner* — Jeffery Williams
(74) *Attorney, Agent, or Firm* — Foley & Lardner LLP

(57) ABSTRACT

[Problem]
With prior art warning devices for vehicles, there is a risk of posing inconvenience to the driver, as well as a risk of the driver failing to notice a warning.
[Means for Solving the Problem]
This invention is provided with an image capture device (1), a detection device (2), an image processing device (3), a primary warning device (4), and a secondary warning device (5). The image capture device (1) captures images of the surroundings of a vehicle (C). The detection device (2) detects vehicle information. The image processing device (3) detects target objects, such as pedestrians (P), from a fish-eye image (A0) of an entire range of surroundings of a vehicle (C) captured by the image capture device (1). If the image processing device (3) detects a target object, the primary warning device (4) displays the target object. If the image processing device (3) assesses that there is a high probability of contact between the vehicle (C) itself and the target object, the secondary warning device (5) transmits a
(Continued)

sensory warning, such as a noise, vibration, or the like, to the driver. As a result, with this invention, a driver can be reliably prompted to use caution, without posing inconvenience to the driver.

8 Claims, 7 Drawing Sheets

(51) Int. Cl.

| | | |
|---|---|---|
| *B60Q 1/00* | (2006.01) | |
| *H04N 7/18* | (2006.01) | |
| *G08G 1/16* | (2006.01) | |
| *B60Q 9/00* | (2006.01) | |
| *B60W 50/16* | (2012.01) | |
| *G06K 9/32* | (2006.01) | |
| *B60R 1/12* | (2006.01) | |

(52) U.S. Cl.
CPC ....... *G06K 9/00805* (2013.01); *G06K 9/3233* (2013.01); *G08G 1/166* (2013.01); *H04N 7/183* (2013.01); *B60R 2001/1253* (2013.01); *B60R 2300/302* (2013.01); *B60R 2300/607* (2013.01); *B60R 2300/8033* (2013.01); *B60R 2300/8093* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2003/0108222 | A1 | 6/2003 | Sato et al. | |
| 2006/0126897 | A1* | 6/2006 | Nagaoka | B60Q 9/008 382/103 |
| 2008/0272898 | A1 | 11/2008 | Irion et al. | |
| 2009/0002523 | A1* | 1/2009 | Maekawa | G06T 3/00 348/231.2 |
| 2009/0141148 | A1* | 6/2009 | Imamura | G06T 3/0062 348/241 |
| 2011/0025489 | A1* | 2/2011 | Shimoda | B60R 1/00 340/459 |
| 2012/0173068 | A1 | 7/2012 | Seiter et al. | |
| 2013/0044218 | A1 | 2/2013 | Matsuda et al. | |
| 2013/0113683 | A1* | 5/2013 | Kitajima | G03B 37/04 345/1.2 |

FOREIGN PATENT DOCUMENTS

| | | |
|---|---|---|
| EP | 2 546 819 A1 | 1/2013 |
| JP | 2001084496 A | 3/2001 |
| JP | 2003196645 A | 7/2003 |
| JP | 2005086279 A | 3/2005 |
| JP | 2005309797 A | 11/2005 |
| JP | 2006074105 A | 3/2006 |
| JP | 2006-253872 A | 9/2006 |
| JP | 2012098776 A | 5/2012 |
| JP | 2012118682 A | 6/2012 |
| WO | WO-2011/132388 A1 | 10/2011 |

OTHER PUBLICATIONS

Japanese Office Action dated Jun. 7, 2016 as received in corresponding Japanese Application No. 2012-168063 and its English translation thereof.

Chinese Office Action dated Nov. 14, 2016 as received in corresponding Chinese Application No. 201380040481.2 and its English translation thereof.

Chinese Office Action dated Jun. 5, 2017 as received in corresponding Chinese Application No. 201380040481.2 and its English translation thereof.

\* cited by examiner

WARNING DEVICE FOR VEHICLE AND OUTSIDE MIRROR DEVICE FOR VEHICLE

TECHNICAL FIELD

The present invention relates to a warning device for vehicle and an outside mirror device for vehicle to issue a warning in a case where there is a possibility that one's own vehicle comes into contact with a target object.

BACKGROUND ART

A vehicle warning device of such type is conventionally known (for example, Patent Literature 1). Hereinafter, a conventional vehicle warning device for vehicle will be described. The conventional warning device for vehicle processes a captured chronological image, and detects and warns a pedestrian who is approaching a vehicle.

CITATION LIST

Patent Literature

Patent Literature 1; Japanese Unexamined Patent Application Publication No. 2005-309797

SUMMARY OF THE INVENTION

Problems to be Solved by the Invention

However, since the conventional warning device for vehicle detects and warns a pedestrian who is approaching a vehicle, a warning is issued even in a case there is no possibility that the vehicle comes into contact with a target object; and therefore, there may be a case in which a driver is caused to feel an inconvenience or a case in which a driver is not aware of such warning.

A problem to be solved by the present invention is that, in the conventional warning device for vehicle, there may be a case in which a driver caused to feel such inconvenience or a case in which a driver is not aware of such warning.

Means for Solving the Problem

A warning device for vehicle according to first aspect of the present invention, comprising: an image capture device to capture a periphery of a vehicle; a detection device to detect information about the vehicle; an image processing device; a primary warning device; and a secondary warning device, wherein the image processing device is comprised of: an image recognition circuit to detect a target object from an image of the periphery of the vehicle, the image having been captured by the image capture device, and to actuate the primary warning device, based on a result of detection; and a contact computation circuit to compute time for the vehicle to come into contact with the target object from information about the vehicle detected by the detection device and to actuate the secondary warning device, based on a result of computation, wherein the primary warning device is comprised of a display device to display the target object, and wherein the secondary warning device is comprised of a device to warn a driver in a bodily sensible manner such as sound or vibration to the driver.

Effect of the Invention

According to the warning device for vehicle, of the present invention, if a target object is detected, a display device of a primary warning device displays the target object and then issues a primary warning to a driver according to visual information, and further, if there is a high possibility that a one's own vehicle comes into contact with the target object, a secondary warning device issues a secondary warning by imparting something to be bodily sensible such as sound or vibration to the driver. As a result, by way of the first warning of visual information, it is possible to mitigate impartment of inconvenience to the driver, and by way of the secondary warning that is something to be bodily sensible such as by way of sound or vibration, it is possible for the driver to be reliably aware of the secondary warning. In this manner, it is possible to make contribution to traffic safety.

MODE FOR CARRYING OUT THE INVENTION

Figure 1:
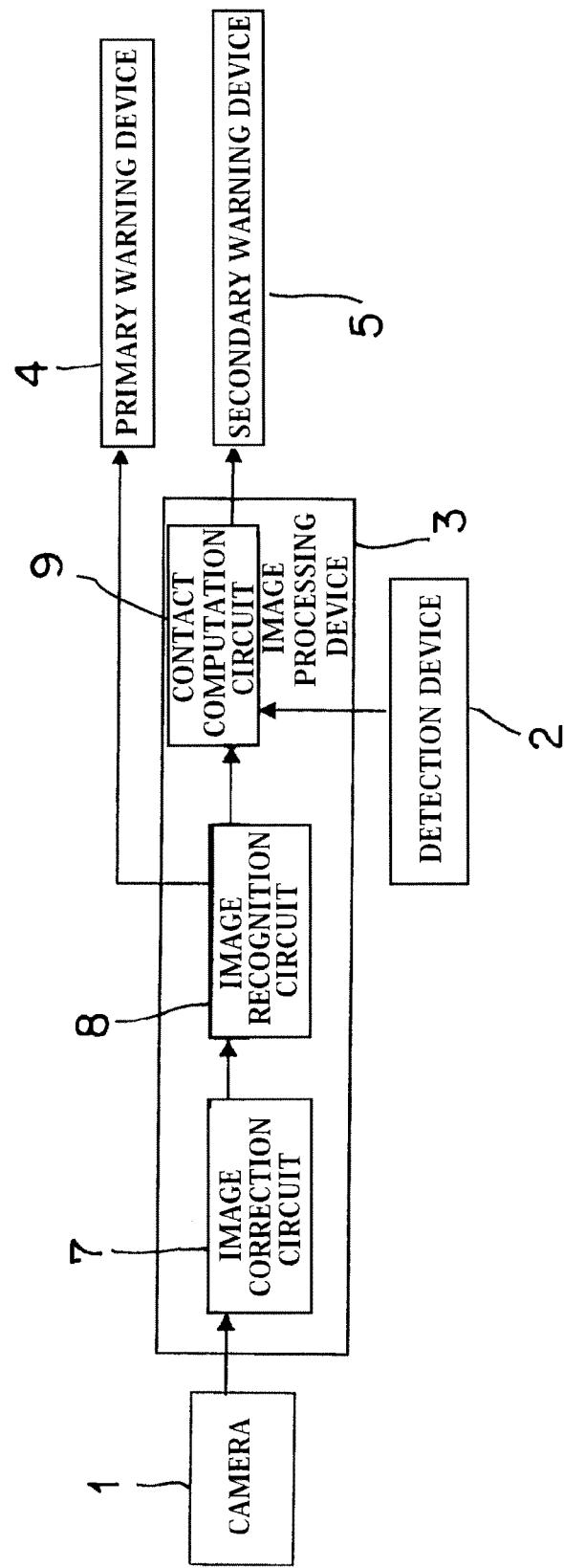
FIG. 1 is a functional block diagram of an entire configuration of an embodiment of a warning device for vehicle, according to the present invention.

Hereinafter, one example of embodiments (exemplary embodiments) of a warning device for vehicle, according to the present invention, will be described in detail with reference to the drawings. In the specification and claims, terms "front", "rear", "top", "bottom", "left", and "right" are respectively referred to as the front, rear, top, bottom, left, and right when the warning device for vehicle, according to the present invention, is mounted to a vehicle C.

In the drawings, reference numeral "F" designates a front side of the vehicle C (a forward direction side of the vehicle C). Reference numeral "B" designates a rear side of the vehicle C. Reference numeral "U" designates an upper side when the front side F is seen from a driver side. Reference numeral "D" designates a lower side when the front side F is seen from the driver's side. Reference numeral "L" designates a left side when the front side F is seen from the driver's side. Reference numeral "R" designates a right side when the front side F is seen from the driver's side.

(Description of Configuration of Embodiment)

Hereinafter, a configuration of the warning device for vehicle, according to the embodiment, will be described. The warning device for vehicle, according to the embodiment, as shown in FIG. 1, is provided with: an image capture device (a camera) L a detection device 2; an image processing device (an image processing ECU) 3; a primary warning device (a primary warning system) 4; and a secondary warning device (a secondary warning system) 5.

(Description of Image Capture Device 1)

The image capture device 1 is mounted to each of the left and right sides of the vehicle C. For example, this device is mounted to a mirror base of an outside mirror device (a door mirror device) 6 which is equipped at each of the left and right doors of the vehicle C or to a vehicle body of the vehicle C. That is, this device is mounted in the vicinity of a base of a front pillar (an A-pillar) 10 of the vehicle C.

Hereinafter, the image capture device 1 that is mounted to a right side R of the vehicle C will be described. It is to be noted that the image capture device 1 that is mounted to a left side L of the vehicle C forms a configuration which is substantially identical to that of the image capture device 1 that is mounted to the right side R of the vehicle C, and captures an image which is substantially transversely symmetrical to that of the image capture device 1 that is mounted to the right side R of the vehicle C, and a duplicate description is omitted.

Figure 4:
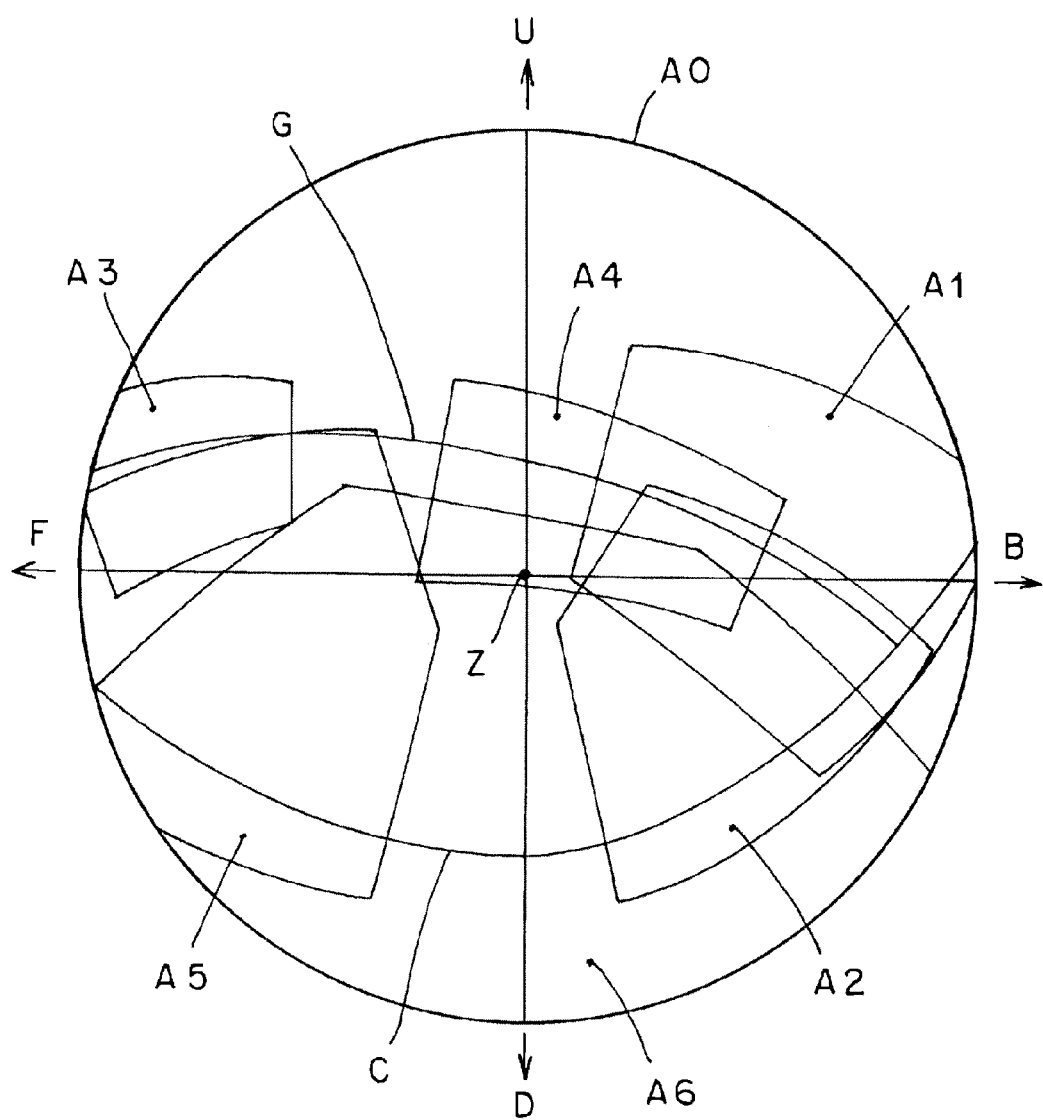
FIG. 4 is an illustrative view depicting an image (a fish-eye image) of the entire range of the right side of the periphery of the vehicle partitioned in a plurality of areas.
Figure 5:
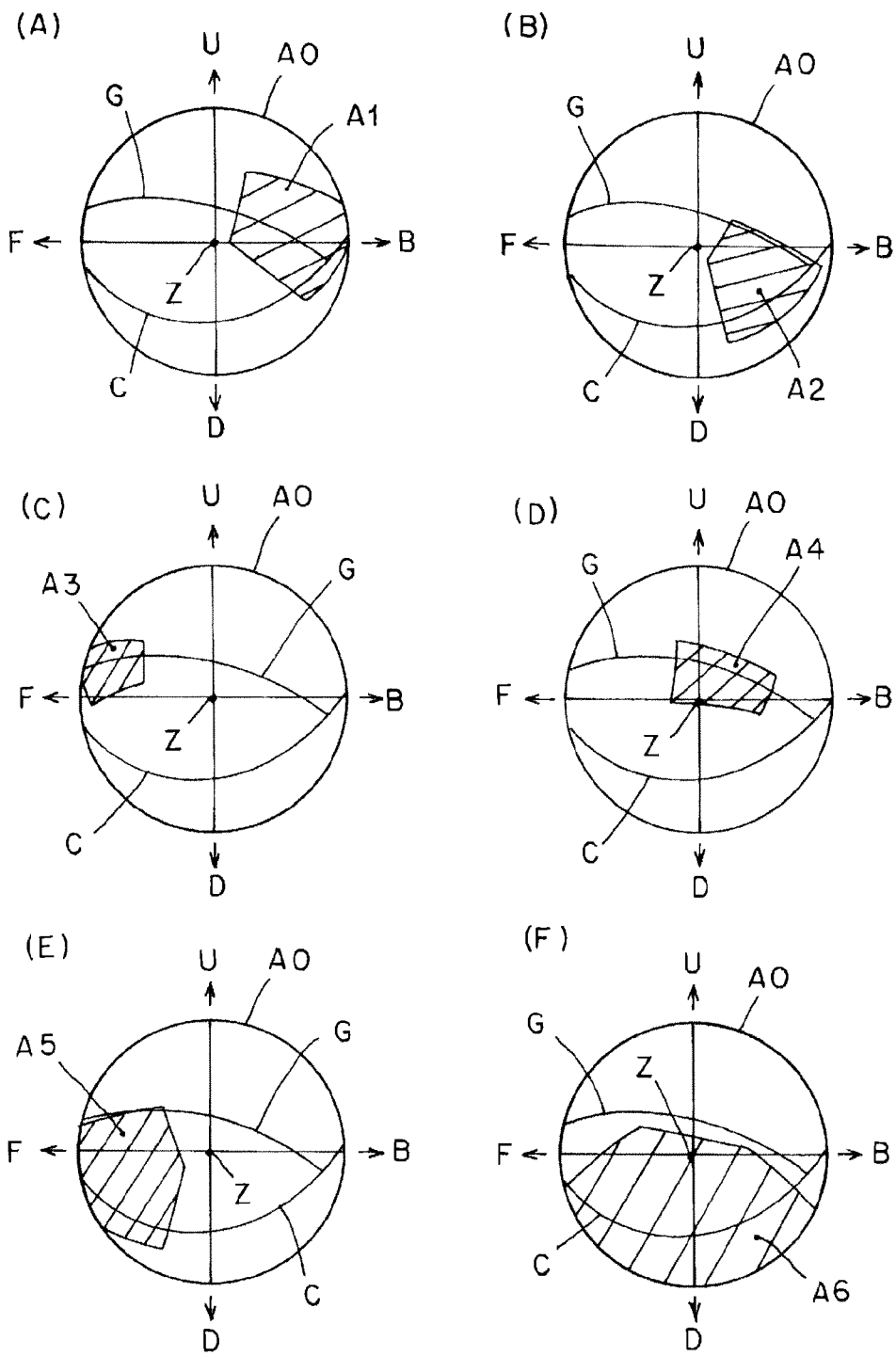
FIGS. 5 (A) to (F) are an illustrative view depicting the plurality of areas of the image (the fish-eye image) of the entire range of the right side of the periphery of the vehicle in each area.

The image capture device 1 is connected to the image processing device 3. The image capture device 1 captures information about the periphery of the vehicle C, and outputs the captured information about the periphery of the vehicle C as image data to the image processing device 3. The image capture device 1 is a fish-eye camera using a wide angle lens, for example, a fish-eye lens. Thus, a fish-eye image A0 of an entire range of the periphery of the vehicle C, the image having been captured by the image capture device 1, as shown in FIG. 3 to FIG. 5, forms a circular shape around an optical axis Z of the image capture device 1.

Figure 2:
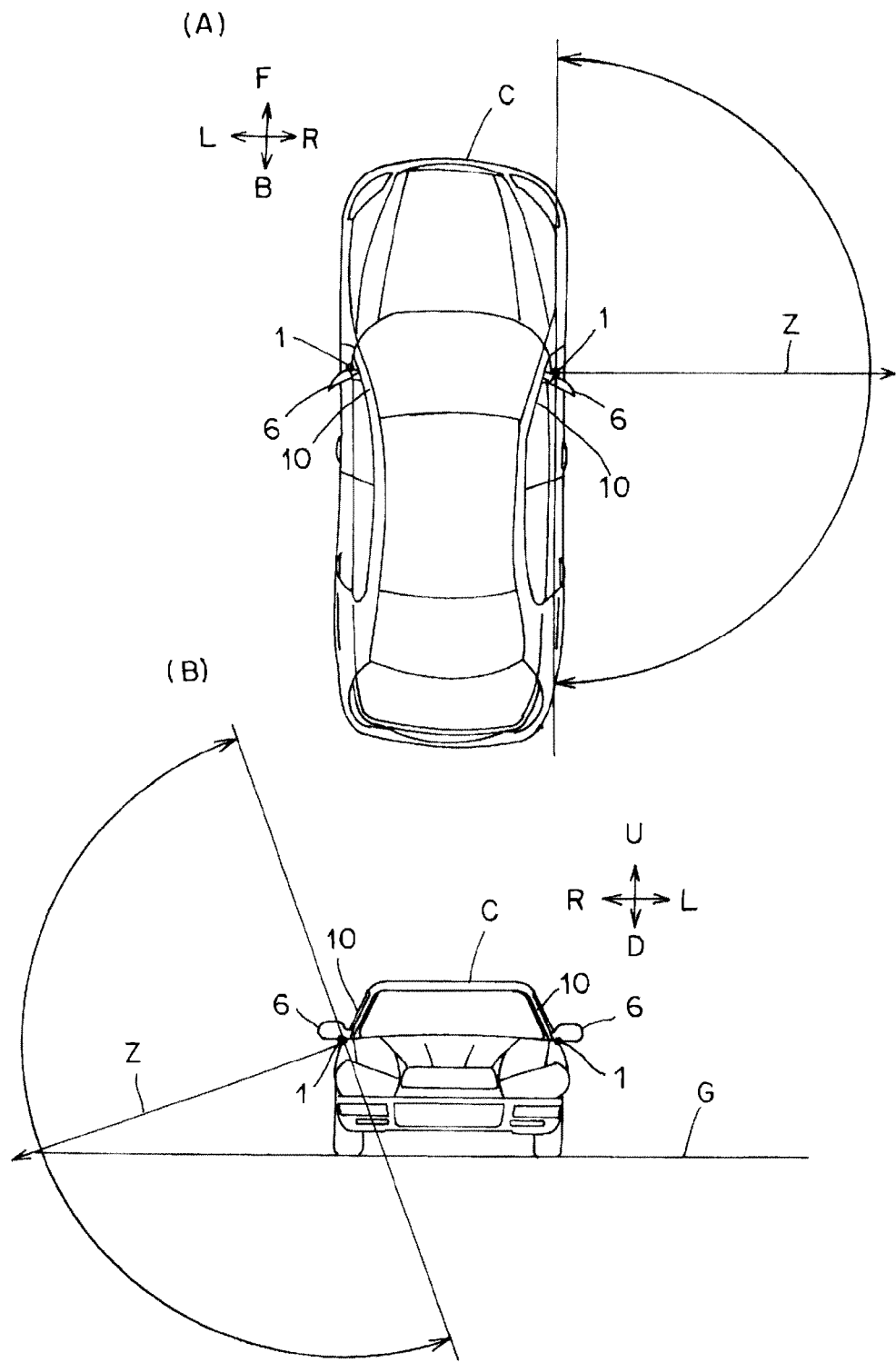
FIGS. 2 (A) and (B) are an illustrative view depicting an image capture range of an image capture device (a fish-eye camera) which is mounted at a right side of a vehicle.

The optical axis Z of the image capture device 1, as shown in FIG. 2 (A), is oriented to one side (the right side R) so as to be orthogonal or substantially orthogonal to the vehicle C when it is seen in a planar view. It is to be noted that this axis may be oriented somewhat in a forward and backward direction with respect to the transverse direction. Also, the optical axis Z of the image capture device 1, as shown in FIG. 2 (B), is oriented somewhat to the outside (the right side R) with respect to a road surface G at a lower side D from the vehicle C when it is seen in a planar view.

Figure 3:
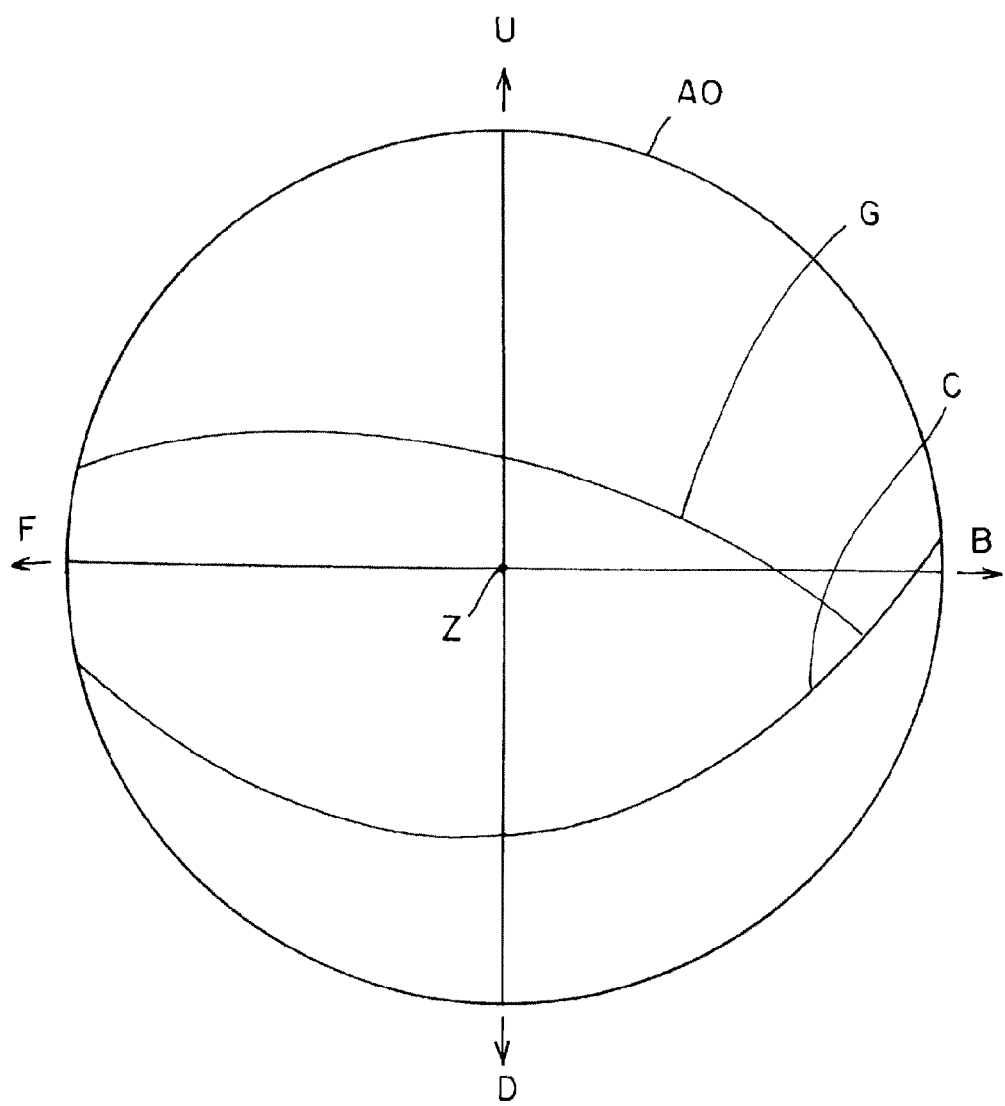
FIG. 3 is an illustrative view depicting an image (a fish-eye image) of an entire range of the right side of the periphery of the vehicle, the image having been captured by the image capture device (the fish-eye camera) that is mounted at the right side of the vehicle.

As a result, the information about the periphery of the vehicle, the information having been captured by the image capture device 1, is output to the image processing device 3, as image data as shown in FIG. 3, That is, a portion of the vehicle C (a portion at the lower side D more significantly than a curve C) is output to the image processing device 3, as image data which is positioned at the lower side D of the fish-eye image A0 of the entire range; also, the road surface G (a portion between a curve G and a curve C) is similarly output thereto, as image data which is positioned in the middle of the fish-eye image A0 of the entire range; and further, a space on the road surface G (a portion at the upper side U more significantly than the curve G) is similarly output thereto, as image data which is positioned at the upper side U of the fish-eye image A0 of the entire range, respectively.

Here, the optical axis Z of the image capture device 1 is oriented somewhat to the outside with respect to a perpendicular line of the road surface G at the lower side D from the vehicle C when it is seen from a front side. Thus, a range (rate) of a part of the vehicle C which is occupied in the fish-eye image A0 of the entire range is small in comparison with a case in which the optical axis Z of the image capture device 1 is oriented in a direction of a perpendicular line of the road surface G at the lower side D from the vehicle C when it is seen from the front side, and a range (rate) of a space on the road surface G which is occupied in the fish-eye image A0 of the entire range is large. In this manner, a visual recognition range of the periphery of the vehicle C broadens.

Since a part of the vehicle C is captured in the fish-eye image A0 of the entire range, a relationship in relative position between the vehicle C and the information about the periphery of the vehicle is clarified. It is to be noted that a part of the vehicle C may be eliminated (ignored) from the inside of the fish-eye image A0 of the entire range. Also, a part of the space on the road surface G may be eliminated (ignored) from the fish-eye image A0 of the entire range.

The image capture device 1 uses a fish-eye lens, and thus, of the image that has been captured by the image capture device 1 (the fish-eye image), an image which is close to a boundary of the image capture range (an image which is close to the circumference shown in FIG. 3 to FIG. 5) is large in distortion in comparison with the image that is close to a center of the image capture range (an image which is close to a center (the optical axis Z) of the circle shown in FIG. 3 to FIG. 5). Thus, by taking a margin to a certain degree at the boundary of the image capture range, that is, by disallowing use of the image that is close to the boundary of the image capture range, a more clear and sharp image can be obtained. It is to be noted that the image capture range of the image capture device 1 may be fully used.

(Description of Detection Device 2)

The detection device 2 is connected to the image processing device 3. The detection device 2 detects information about the vehicle C, and outputs the detected vehicle information as a detection signal to the image processing device 3. The detection device 2 is provided with: a vehicle speed sensor (not shown); a steering angle sensor (not shown); and a direction indication detection portion (not shown).

The vehicle speed sensor detects a speed of the vehicle C, and outputs a vehicle speed signal of which a pulse varies according to the vehicle speed, to the image processing device 3. The vehicle information that is detected by the vehicle speed sensor is the speed of the vehicle C.

The steering angle sensor detects a steering angle (a synonym for a rudder angle) and a steering direction and an angular speed of a steering handle (not shown and a synonym for steering wheel or handle), and outputs a steering angle signal and a steering direction signal and an angular speed signal to the image processing device 3. That is, the steering angle sensor detects a steering angle (a rotational angle) and a steering direction (a rotational direction) and an angular speed (a rotational speed) of a steering handle which is steered by a driver, and outputs a steering angle signal and a steering direction signal and an angular speed signal to the image processing device 3, in a case where the vehicle C cruises on a curved road (a leftward curved road or a rightward curved road), or alternatively, in a case where the vehicle C turns to the left or right at an intersection. The vehicle information that is detected by the steering angle sensor is a leftward turn or a rightward turn at a curved road or an intersection of the vehicle C.

The direction indication detection portion detects operation of direction indication which is performed by a driver, and outputs a direction indication signal to the image processing device 3. The direction indication detection portion is composed of a left side winker switch and a right side winker switch, for example. The left side winker switch or the right side winker switch, in this example, is turned ON by a driver when an intersection or the like is turned to the left or right, and after the intersection has been turned to the left or right, the switch automatically turns OFF at a time point at which the steering handle returns at a predetermined angle or more. Also, the left side winker switch or the right side winker switch outputs an ON switch (for example, a high level signal) to the image processing device 3 when it is turned ON, and outputs an OFF signal (for example, a low level signal) to the image processing device 3 when it is turned OFF. Further, when the left side winker switch or the right side winker switch is turned ON, a left side turning signal lamp (not shown) or a right side turning signal lamp (not shown) blinks and lights up, and when the left side winker switch or the right side winker switch is turned OFF, the left side turning signal lamp or the right side turning signal lamp goes out. The vehicle information that is detected by the direction indication detection portion is a leftward turn or a rightward turn at an intersection of the vehicle C.

(Description of Image Processing Device 3)

The image processing device 3 is connected to a respective one of the image capture device 1, the detection device 2, the primary warning device 4, and the secondary warning device 5. The image processing device 3 is composed of an image correction circuit 7, an image recognition circuit 8, and a contact computation circuit 9.

The image correction circuit 7 corrects a fish-eye image from the image capture device 1 (refer to FIG. 4 or FIG. 5) to a normal image (not shown). That is, a fish-eye image is distorted. Thus, the image correction circuit 7 corrects the fish-eye image to the normal image by normal image conversion of a coordinate system or a rotational angle or the like.

The image recognition circuit 8 detects a target object from a normal image obtained on the basis of an image (a fish-eye image) of the periphery of the vehicle C which has been captured by the image capture device 1, the captured image having been corrected by the image correction circuit 7, and actuates the primary warning device 4 on the basis of a result of detection. That is, the image recognition circuit 8 detects the target object from the normal image, and actuates the primary warning device 4 when determining that the target object is present at the periphery of the vehicle C. The target object is a pedestrian P (refer to FIG. 6), a bicycle, or another vehicle or the like. Also, the image recognition circuit 8 outputs the normal image to the contact computation circuit 9 when determining that the target object is present at the periphery of the vehicle C.

As means for detecting the target object from the normal image, there is exemplified the means set forth in Patent Literature 1 mentioned previously or the means set forth in Japanese Unexamined Patent Application Publication No. 2011-210087 or another means.

The means set forth in Patent Literature 1 mentioned previously is a method for detecting a target object (a pedestrian) while paying an attention to pixels (differential pixels) in which a difference in concentration of a preset value or more is generated in the respective pixels between images. That is, an area (a pixel size) in a differential region which is generated in an image is compared with a criterial value which is preset to determine whether or not a target object is present, and if the area (the pixel size) in the differential region is the criterial value or more, it is determined that the target object is present at the periphery of a vehicle.

The means set forth in Japanese Unexamined Patent Application Publication No. 2011-210087 mentioned previously is means for scanning a detection window of an image of one frame, comparing an image of the detection window and a reference image with each other, and determining whether or not a target object (a pedestrian) is present at the periphery of a vehicle. That is, in a state in which the detection window is defined in a fixed size while an image of one frame is resized by enlarging or reducing the image in a plurality of steps, the detection window is scanned, and if the quantity of image features of a target object in the detection window and the quantity of reference image features of a target object are coincident with each other in predetermined quantity or more, it is determined that the target object is present at the periphery of the vehicle.

Such another means mentioned previously is means for respectively scanning detection frames of different sizes in an image of one frame, comparing features of images in the detection frames and features of a reference image learned, with each other, and if a coincident feature exceeds a threshold value, determining that a target object (a pedestrian) is present at the periphery of a vehicle.

The image recognition circuit 8, when detecting the target object from the normal image, outputs to the primary warning device 4 a partial normal image (not shown) of a range in which the target object is present at the normal image, the partial normal image being obtained while the target object is surrounded by a frame (not shown). The frame is displayed in a blinked manner or highlights the surrounded object. It is to be noted that the image recognition circuit 8 may output only the partial normal image to the primary warning device 4.

The partial normal image is an image which is obtained by respectively correcting to normal images, a plurality of, in this example, six partial fish-eye images A1, A2, A3, A4, A5, A6 (hereinafter, occasionally referred to as "A1 to A6") which are cut out from the fish-eye image A0 of the entire range of the periphery of the vehicle C, the fish-eye image having been captured by the image capture device 1.

Hereinafter, the six partial fish-eye images A1 to A6 will be described referring to FIG. 4 to FIG. 6. A first partial fish-eye image (a mirror view) A1 is a partial fish-eye image of a range which is identical to a visual recognition range obtained by a rearview mirror for vehicle such as the outside mirror device (a door mirror device) 6, and is also a partial fish-eye image of a rear side of a vehicle, that is, of a range of the rear side B at one side (the right side R) of the vehicle C.

A second partial fish-eye image (an under-mirror view) A2 is a partial fish-eye image of a range of the lower side D more significantly than the first partial fish-eye image A1, and is also a partial fish-eye image of a range in the vicinity of the rear side B of the vehicle C forming a dead space of a driver.

A third partial fish-eye image (a pillar view) A3 is a partial fish-eye image of a range which is substantially identical to a range forming a dead space of a driver by the front pillar 10 of the vehicle C.

A fourth partial fish-eye image (a lateral view or a just lateral view) A4 is a partial fish-eye image of a range which is substantially identical or wider than a range forming a dead space of a driver just beside (the just right side R) of the vehicle C.

A fifth partial fish-eye image (a side view) A5 is a partial fish-eye image of a range in the vicinity of a tire at the front side F of the vehicle C forming a dead space of a driver.

A sixth partial fish-eye image (an around view or a view of angle of depression) A6 is a partial fish-eye image of a range which is substantially identical or wider than a range forming a dead space of a driver just beside (the just right side R) of the vehicle C and at a just lower side (the just lower side D) of the vehicle C.

The contact computation circuit 9 estimates a relative speed vector between the vehicle C and the target object from the normal image or the partial normal image that is input from the image recognition circuit 8, also computes time for the vehicle C to come into contact with the target object from information about the vehicle C which is detected by the detection device 2, and actuates the secondary warning device 5 on the basis of a result of computation.

That is, the contact computation circuit 9 computes time for the vehicle C to come into contact with the target object when determining that a vector direction is approaching in the relative speed vector between the vehicle C and the target object. As a result of computation, when determining that a contact time is a threshold value or less, this circuit outputs a turn ON signal to the secondary warning device 5, and actuates the secondary warning device 5.

As means for estimating the relative speed vector between the vehicle C and the pedestrian P from the normal image, there is exemplified means for detecting a motion in an image by a set of vector quantities having an optical flow, that is, a size and an orientation, as described in Patent Literature 1 mentioned previously.

(Description of Primary Warning Device 4)

The primary warning device 4 is a display device to display a result of detection from the image recognition circuit 8, that is, the partial normal image obtained while the target object that is output from the image recognition circuit 8 is surrounded by a frame, and subsequently, visually caution a driver. The primary warning device 4 is composed of display devices such as an organic EL display, a plasma display, a liquid crystal display or a laser projector to display a target object at a front glass of the vehicle C, and a head-up display. The primary warning device 4 may be provided integrally with or separately from a display device having another function (not shown).

The primary warning device 4 is provided at a center of an instrument panel in a driver's chamber, for example, and displays the partial fish-eye images from the left and right image capture devices 1 together (simultaneously). Also, it may be that the primary warning device 4 is provided at a respective one of the left and right front pillars 10 in the driver's chamber, and is distributed at each of the left and the right in accordance with the left and right image capture devices 1. That is, the partial fish-eye image from the image capture device 1 at the left side L is displayed on the first warning device 4 at the left side L, and the partial fish-eye image from the image capture device 1 at the right side R is displayed on the primary warning device 4 at the right side R.

(Description of Secondary Warning Device 5)

The secondary warning device 5 is a voice device or a vibration device which is actuated according to a result of computation from the contact computation circuit 9, that is, by way of a turn ON signal which is output from the contact computation circuit 9. The voice device acoustically cautions a driver by generating sound or voice, for example. The vibration generation device tangibly cautions a driver by vibrating a part of a driver's seat, for example.

(Description of Functions of Embodiment)

Figure 7:
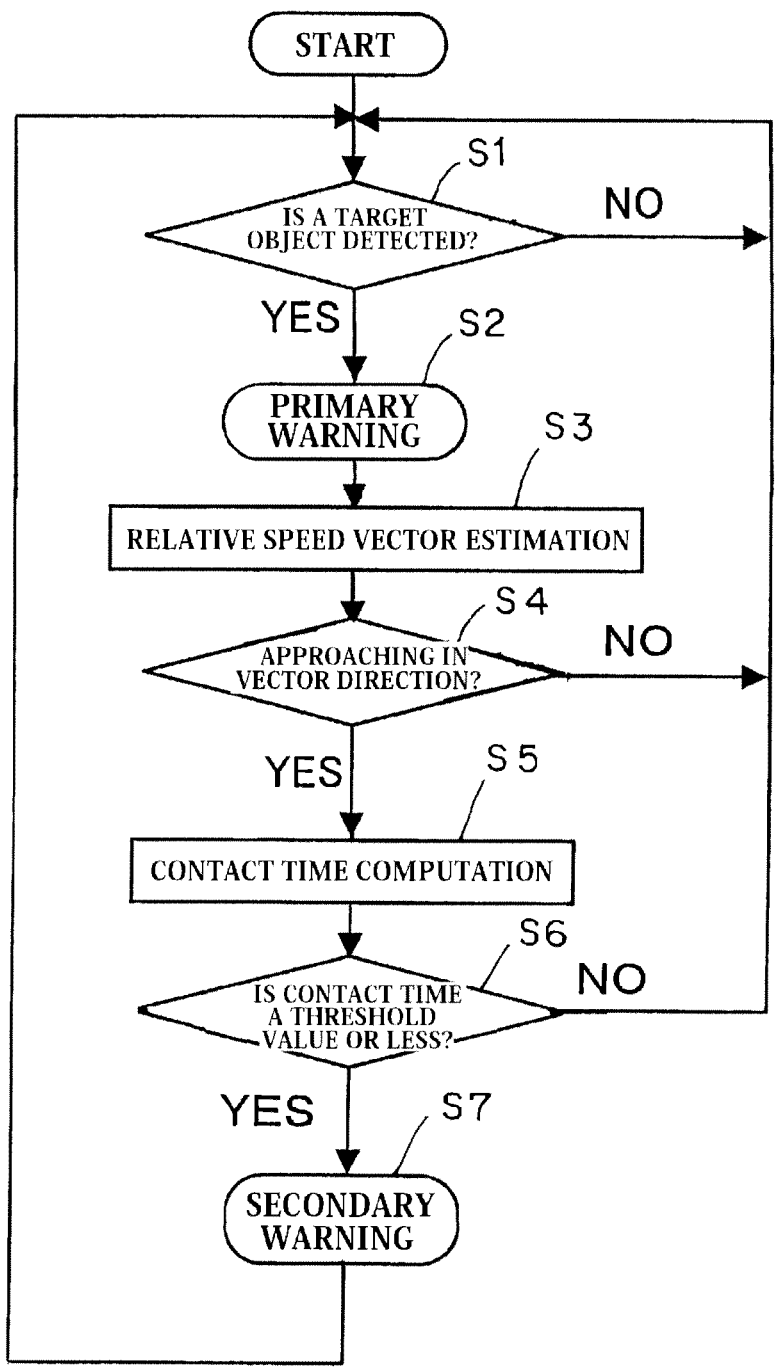
FIG. 7 is a flowchart showing functions.

The warning device for vehicle, according to the embodiment, is made of the configuration as described above, and hereinafter, functions thereof will be described referring to the flowchart of FIG. 7.

First, start is made effective by turning ON an ignition switch (not shown). First, the detection device 2 detects information about the vehicle C (such as a vehicle speed, a steering angle, or a leftward turn or a rightward turn), and outputs the detected information to the contact computation circuit 9 of the image processing device 3. Also, the image pickup device 1 captures the periphery of the vehicle C, and outputs the captured fish-eye image to the image correction circuit 7 of the image processing device 3. The image correction circuit 7 corrects the fish-eye image that is input from the image capture device 1 for a normal image, and outputs the corrected normal image to the image recognition circuit 8. The image recognition circuit 8 detects a target object from the normal image that is input from the image correction circuit 7, and determines whether or not the target object is present at the periphery of the vehicle C (Is a target object detected? S1). If no object is detected, and no object is present at the periphery of the vehicle C, the routine reverts to the previously mentioned step (S1).

Figure 6:
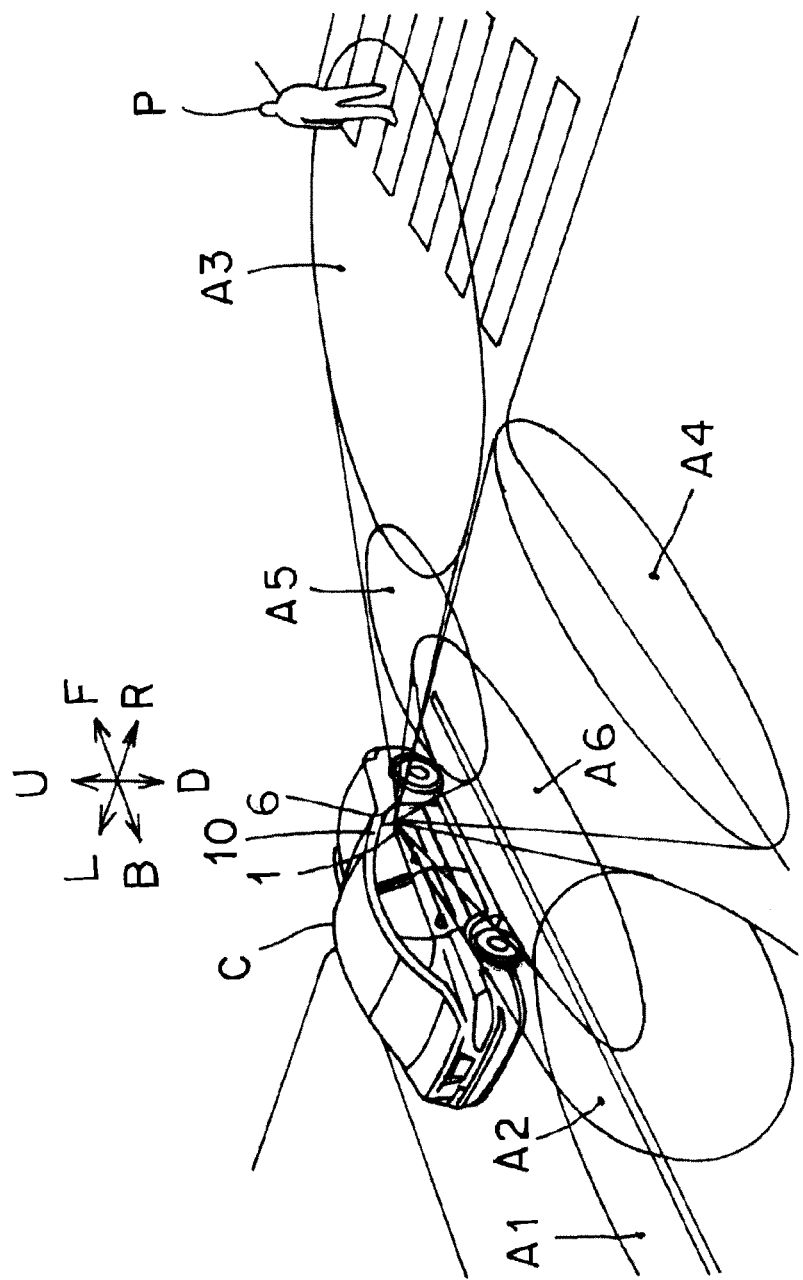
FIG. 6 is an illustrative view depicting a plurality of areas on a road surface on the right side of the periphery of the vehicle, respectively corresponding to the plurality of areas of the image (the fish-eye image) of the entire range of the right side of the periphery of the vehicle.

In the previously mentioned step (S1), in a case where a target object is detected, and the target object is present at the periphery of the vehicle C, for example, as shown in FIG. 6, in a case where a pedestrian P as a target object is present at a front right side (the front side F and the right side R) of the vehicle (one's own vehicle) C, the image recognition circuit 8 outputs to the primary warning device 4 a partial normal image of a range in which the pedestrian P as the target object is present (a partial normal image corresponding to the third partial fish-eye image A3), in a state in which the partial normal image is obtained while the pedestrian P is surrounded by a frame.

The primary warning device 4 displays the partial normal image obtained while the pedestrian P that is input from the image recognition circuit 8 is surrounded by the frame, and issues a primary warning to a driver (a first warning S2).

Also, the image recognition circuit 8 outputs a normal image or a partial normal image to the contact computation circuit 9. The contact computation circuit 9 estimates a relative speed vector between the vehicle C and the pedestrian P from the normal image or the partial normal image that is input from the image recognition circuit 8 (relative speed vector estimation S3).

Further, the contact computation circuit 9 determines whether or not the vehicle C and the pedestrian P relatively approach to each other from the relative speed vector between the vehicle C and the pedestrian P (approaching in vector direction? S4). In a case where the vehicle C and the pedestrian P are relatively spaced from each other, the routine reverts to the previously mentioned step (S1).

In the previously mentioned step (S4), in a case where the vehicle C and the pedestrian P relatively approach to each other, the contact computation circuit 9 computes time for the vehicle C to come into contact with the pedestrian P, based on the information about the vehicle C input from the detection device 2 (contact time computation S5).

Then, the contact computation circuit 9 determines whether or not the contact time is a threshold value or less (Is contact time a threshold value or less? S6). In a case where the contact time is longer than the threshold value, the routine reverts to the previously mentioned step (S1).

In the previously mentioned step (S6), in a case where the contact time is the threshold value or less, the contact computation circuit 9 outputs a turn ON signal to the secondary warning device 5.

The secondary warning device 5 is actuated by the turn ON signal that is input from the contact computation circuit 9. That is, in the case of the voice device, for example, sound or voice is generated, and a driver is acoustically cautioned. Also, in the case of the vibration generation device, for example, a part of the driver's seat is vibrated, and the driver is tangibly cautioned (a secondary warning S7). Then, the routine reverts to the previously mentioned step (S1).

(Description of the Outline of the Present Invention)

A warning device for vehicle according to the present invention, comprising: an image capture device 1 to capture a periphery of a vehicle; a detection device 2 to detect information about the vehicle; an image processing device 3; a primary warning device 4; and a secondary warning device 5, wherein the image processing device 3 is comprised of; an image recognition circuit 8 to detect a target object from an image of the periphery of the vehicle, the image having been captured by the image capture device 1, and to actuate the primary warning device 4, based on a result of detection; and a contact computation circuit 9 to compute time for the vehicle to come into contact with the target object from information about the vehicle detected by the detection device 2 and to actuate the secondary warning device 5, based on a result of computation, wherein the primary warning device 4 is comprised of a display device to display the target object, and wherein the secondary warning device 5 is comprised of a device to warn a driver in a bodily sensible manner such as sound or vibration to the driver.

The warning device for vehicle, according to another aspect of the present invention, wherein, in a case where the result of computation of the contact computation circuit 9 is determined to be a predetermined threshold value or less, the image processing device 3 is configured to determine that a probability in contact between the vehicle of one's own and the target object is high, output a turn ON signal from the contact computation circuit 9 to the secondary warning device 5, and actuate the secondary warning device 5.

The warning device for vehicle, according to according to another aspect of the present invention, wherein the image capture device 1 comprises a fisheye lens to capture the periphery of the vehicle as a fisheye image, and the image processing device 3 further comprises an image correction circuit 7 to input the fish-eye image of the periphery of the vehicle, the fish-eye image having been captured by the fish-eye lens, correct the input to a normal image, and output the corrected normal image to the image recognition circuit 8.

The warning device for vehicle, according to according to another aspect of the present invention, wherein the image capture device 1 is provided at an outside mirror device 6 of the vehicle, and is configured to capture a range which is identical to a visual recognition range obtained by a rear-view mirror for vehicle, the image correction circuit 7 respectively corrects to normal images a plurality of partial fish-eye images which are obtained from a fish-eye image of a periphery of a rear side of the vehicle, the fish-eye image having been captured by the image capture device 1, and the image recognition circuit 1 detects a target object from among the plurality of normal images, and outputs to the primary warning device 4 a normal image of a range in which the target object is present at the plurality of normal images.

The warning device for vehicle, according to according to another aspect of the present invention, wherein the secondary warning device 5 is comprised of at least one or more of a voice output device to output voice and a vibration generation device to generate vibration.

The warning device for vehicle, according to according to another aspect of the present invention, wherein the primary warning device 4 is composed of a display to represent a partial normal image on which the target object is highlighted and corrected by the image recognition circuit 8.

The warning device for vehicle, according to according to another aspect of the present invention, wherein the detection device 2 is comprised of at least one or more of a vehicle speed sensor, a steering angle sensor, and a direction indication detection sensor.

According to another aspect of the present invention, an outside mirror device 6 for vehicle, comprising a mirror base which is provided at each of left and right sides of the vehicle that comprises the detection device 2, the image processing device 3, the primary warning device 4, and the secondary warning device 5, of the warning device for vehicle, according to claim 1, and at which the image capture device 1 of the warning device for vehicle is provided for capturing the periphery of the rear side of the vehicle.

(Description of Advantageous Effects of Embodiment)

The warning device for vehicle, according to the embodiment, is composed of the configuration and functions as described above, and hereinafter, advantageous effects thereof will be described.

According to the warning device for vehicle, of the present invention, if a target object (such as another vehicle or bicycle and pedestrian P) is detected, a display device of a primary warning device 4 displays the target object and then issues a primary warning to a driver according to visual information, and further, if there is a high possibility that a one's own vehicle C comes into contact with the target object, a secondary warning device 5 issues a secondary warning by imparting something to be bodily sensible such as sound or vibration to the driver. As a result, by way of the first warning of visual information, it is possible to mitigate impartment of inconvenience to the driver, and by way of the secondary warning that is something to be bodily sensible such as by way of sound or vibration, it is possible for the driver to be reliably aware of the secondary warning. In this manner, it is possible to make contribution to traffic safety.

(Description of Examples Other than Embodiment)

It is to be noted that, in the foregoing embodiment, the image capture device 1 is mounted at each of the left and right sides of the vehicle C, for example, on a mirror base of the outside mirror device 6 that is equipped at each of the left and right doors of the vehicle C, or alternatively, at a vehicle body of the vehicle C. That is, the image capture device is mounted in the vicinity of the base of the front pillar 10 of the vehicle C. However, in the present invention, a position at which the image capture device 1 is to be mounted is not limited in particular.

The invention claimed is:

1. A warning device for vehicle, comprising:
a camera configured to capture an image of periphery of a vehicle;
a detector configured to detect information about the vehicle;
an image processing device;
a primary warning device; and
a secondary warning device,
wherein the image processing device is comprised of:
an image recognition circuit to detect a target object from the image of the periphery of the vehicle and to, when detecting the target object, actuate the primary warning device based on a detection result of the target object while outputting the image; and
a contact computation circuit to, in a case where the image recognition circuit outputs the image when actuating the primary warning device, then compute time for the vehicle to come into contact with the target object from the image output by the image recognition circuit and information about the vehicle detected by the detector to actuate the secondary warning device based on a result of computation of the time,
wherein the primary warning device is comprised of a display device to display the target object, and
wherein the secondary warning device is comprised of a device to warn a driver in a bodily sensible manner.

2. The warning device for vehicle, according to claim 1, wherein, in a case where the result of computation of the contact computation circuit is determined to be a predetermined threshold value or less, the image processing device is configured to determine that a probability in contact between the vehicle of one's own and the target object is high, output a turn ON signal from the contact computation circuit to the secondary warning device, and actuate the secondary warning device.

3. The warning device for vehicle, according to claim 1, wherein
the camera comprises a fish-eye lens to capture the periphery of the vehicle as a fish-eye image, and
the image processing device further comprises an image correction circuit to input the fish-eye image of the periphery of the vehicle, the fish-eye image having been captured by the fish-eye lens, correct the input to a normal image, and output the corrected normal image to the image recognition circuit.

4. The warning device for vehicle, according to claim 3, wherein
the camera is provided at an outside mirror device of the vehicle, and is configured to capture a range which is identical to a visual recognition range obtained by a rearview mirror for vehicle,
the image correction circuit respectively corrects to normal images a plurality of partial fish-eye images which are obtained from a fish-eye image of a periphery of a rear side of the vehicle, the fish-eye image having been captured by the camera, and
the image recognition circuit detects a target object from among the plurality of normal images, and outputs to the primary warning device a normal image of a range in which the target object is present at the plurality of normal images.

5. The warning device for vehicle, according to claim 1, wherein
the secondary warning device is comprised of at least one or more of a voice output device to output voice and a vibration generation device to generate vibration.

6. The warning device for vehicle, according to claim 1, wherein
the primary warning device is composed of a display to represent a partial normal image on which the target object is highlighted and corrected by the image recognition circuit.

7. The warning device for vehicle, according to claim 1, wherein
the detector is comprised of at least one or more of a vehicle speed sensor, a steering angle sensor, and a direction indication detection sensor.

8. An outside mirror device for vehicle, comprising a mirror base which is provided at each of left and right sides of the vehicle that comprises the detector, the image processing device, the primary warning device, and the secondary warning device, of the warning device for vehicle, according to claim 1, and at which the camera of the warning device for vehicle is provided for capturing the periphery of the rear side of the vehicle.

* * * * *